United States Patent
Hoffjann et al.

(10) Patent No.: US 11,158,874 B2
(45) Date of Patent: Oct. 26, 2021

(54) AUXILIARY POWER SYSTEM FOR AN AIRPLANE AND AN AIRPLANE WITH SUCH AN AUXILIARY POWER SYSTEM

(71) Applicant: Airbus Operations GmbH, Hamburg (DE)

(72) Inventors: Claus Hoffjann, Hamburg (DE); Wolfgang Engel, Hamburg (DE)

(73) Assignee: Airbus Operations GmbH

( * ) Notice: Subject to any disclaimer, the term of this patent is extended or adjusted under 35 U.S.C. 154(b) by 78 days.

(21) Appl. No.: 16/561,343

(22) Filed: Sep. 5, 2019

(65) Prior Publication Data

US 2019/0393531 A1 Dec. 26, 2019

Related U.S. Application Data

(63) Continuation of application No. 14/975,347, filed on Dec. 18, 2015, now Pat. No. 10,446,863.

(30) Foreign Application Priority Data

Dec. 19, 2014 (DE) ...................... 10 2014 119 279.6

(51) Int. Cl.
*H01M 8/1007* (2016.01)
*H01M 8/2418* (2016.01)
(Continued)

(52) U.S. Cl.
CPC .......... *H01M 8/1007* (2016.02); *B64D 13/06* (2013.01); *B64D 41/00* (2013.01);
(Continued)

(58) Field of Classification Search
CPC .......... H01M 2250/20; H01M 8/1007; H01M 8/2457; H01M 8/0401; H01M 8/241;
(Continued)

(56) References Cited

U.S. PATENT DOCUMENTS 5,442,905 A 8/1995 Claeys et al.
5,911,388 A 6/1999 Severson et al.
(Continued)

FOREIGN PATENT DOCUMENTS

DE 198 21 952 A1 11/1999
DE 10 2004 058 430 A1 6/2006
(Continued)

OTHER PUBLICATIONS

European Search Report (dated May 25, 2016) (EP 15201217.5).
(Continued)

*Primary Examiner* — James Lee
(74) *Attorney, Agent, or Firm* — Lerner, David, Littenberg, Krumholz & Mentlik, LLP

(57) ABSTRACT

An auxiliary power system for an airplane includes at least one fuel cell unit each with at least one fuel cell, a voltage output, a fuel intake and an outlet for reaction products, a fuel tank that is couplable with the fuel intake of the fuel cell unit, at least one compressor unit with an air intake and air outlet and an electric motor, which is couplable with a voltage output of the at least one fuel cell unit and, by way of a shaft, with the at least one compressor unit. At least the at least one fuel cell unit, the compressor unit and the electric motor are interconnected to yield a coherent unit, which continuously provides electrical power and pressurized air.

14 Claims, 2 Drawing Sheets

(51) Int. Cl.
| | |
|---|---|
| *H01M 8/2428* | (2016.01) |
| *H01M 8/243* | (2016.01) |
| *H01M 8/241* | (2016.01) |
| *H01M 8/2457* | (2016.01) |
| *H01M 8/04014* | (2016.01) |
| *B64D 13/06* | (2006.01) |
| *B64D 41/00* | (2006.01) |
| *H01M 8/1018* | (2016.01) |

(52) U.S. Cl.
CPC ....... *H01M 8/04014* (2013.01); *H01M 8/241* (2013.01); *H01M 8/2457* (2016.02); *B64D 2013/0611* (2013.01); *B64D 2013/0644* (2013.01); *B64D 2041/005* (2013.01); *H01M 2008/1095* (2013.01); *H01M 2250/20* (2013.01); *H01M 2300/0082* (2013.01); *Y02T 50/40* (2013.01); *Y02T 50/50* (2013.01); *Y02T 90/40* (2013.01)

(58) Field of Classification Search
CPC ........ H01M 8/04; H01M 8/10; H01M 8/2418; H01M 8/2428; H01M 8/243; H01M 8/04231; B64D 13/00; B64D 41/00; B64D 2041/00
See application file for complete search history.

(56) References Cited

U.S. PATENT DOCUMENTS

| | | |
|---|---|---|
| 6,296,957 B1 | 10/2001 | Graage |
| 2003/0075643 A1 | 4/2003 | Dunn |
| 2003/0178895 A1 | 9/2003 | Ritterhoff |
| 2006/0099477 A1 | 5/2006 | Hoffjann et al. |
| 2006/0199064 A1 | 9/2006 | Arnold et al. |
| 2006/0237583 A1 | 10/2006 | Fucke et al. |
| 2010/0316928 A1 | 12/2010 | Westenberger et al. |
| 2014/0325991 A1 | 11/2014 | Liew et al. |

FOREIGN PATENT DOCUMENTS

| | | |
|---|---|---|
| DE | 10 2006 009 844 A1 | 9/2007 |
| DE | 10 2012 007 384 A1 | 10/2013 |
| EP | 0957026 A2 | 11/1999 |
| EP | 1928745 B1 | 6/2012 |
| EP | 2222562 B1 | 8/2012 |
| WO | 2004/037641 A2 | 5/2004 |
| WO | 2011/147977 A2 | 12/2011 |
| WO | 2013/087051 A1 | 6/2013 |

OTHER PUBLICATIONS

German Search Report (dated Sep. 29, 2015) (DE 10 2014 119 279.6).
International Search Report and Written Opinion (PCT/EP2016/056915) (dated Jun. 27, 2016).
Chinese Search Report for OA for CN2016800200429 dated Nov. 27, 2019. (pp. 1 and 2 categorizing references).

AUXILIARY POWER SYSTEM FOR AN AIRPLANE AND AN AIRPLANE WITH SUCH AN AUXILIARY POWER SYSTEM

CROSS-REFERENCE TO RELATED APPLICATIONS

The present application is a continuation of U.S. patent application Ser. No. 14/975,347, filed on Dec. 18, 2015, which claims priority from German Patent Application No. 10 2014 119 279.6 filed Dec. 19, 2014, all of which are incorporated herein by reference.

FIELD OF THE INVENTION

The invention relates to an auxiliary power system for an airplane and an airplane with such an auxiliary power system.

BACKGROUND OF THE INVENTION

Commercial aircraft are usually equipped with auxiliary engines, which are used in particular while on the ground for supplying onboard systems and starting up engines. Auxiliary engines are often designed as gas turbines coupled with a generator, which provide a high electrical power while requiring little installation space, and also a high pneumatic power in conjunction with a bleed air connection. As a consequence, the supply of electrical components of the airplane on the ground and operation of an air conditioning system can be ensured through the supply of bleed air. However, the gas turbine design may be expected to result in a significant level of noise, and gas turbines further consume a large quantity of supplied fuel. Depending on the used propellant, emissions of unburned hydrocarbons, nitrogen oxides and other pollutants into the environment of the airplane may be expected.

The operation of auxiliary engines is significantly restricted at many airports, especially in urban areas.

EP 1 928 745 B1 and EP 2 222 562 B1 show fuel cell systems that are integrated into an airplane.

BRIEF SUMMARY OF THE INVENTION

An aspect of the invention may be regarded in particular as proposing an auxiliary power system that may reliably and efficiently provide electrical and pneumatic power, while at the same time having a low fuel consumption and only a slight noise emission.

Proposed is an auxiliary power system for an airplane, comprising at least one fuel cell unit each with at least one fuel cell, a voltage output, a fuel intake and an outlet for reaction products, a fuel tank that is couplable with the fuel intake of the fuel cell unit, at least one compressor unit with an air intake and air outlet and an electric motor, which is couplable with a voltage output of the at least one fuel cell unit and, by way of a shaft, with the at least one compressor unit. At least the at least one fuel cell unit, the compressor unit and the electric motor are interconnected to yield a coherent unit, which continuously provides electrical power and pressurized air.

The at least one fuel cell may be realized in whatever manner desired, wherein phosphoric acid fuel cells or other medium-temperature fuel cells may also be used apart from polymer electrolyte membrane fuel cells (PEM fuel cells), wherein the temperature levels for both types of fuel cells may be correspondingly selected. Medium and higher temperatures of 60 to 90° may be selected for a PEM fuel cell, while medium-temperature fuel cells may be operated at distinctly higher temperatures, e.g., of 120° C. or above. A combination with solid oxide fuel cells, which have a temperature range exceeding 500° C., would be alternatively conceivable.

The term "at least one fuel cell" must be understood to mean that use may be made both of a single fuel cell, as well as of a plurality of fuel cells, which are series connected or parallel connected, or grouped or stacked. In particular when several fuel cells are configured as a fuel cell stack, the feed lines and inlets or discharge lines and outlets may ideally be combined with each other.

The fuel tank is a unit that may guide fuel to the fuel cell unit as needed, wherein various technologies may be used, depending on the used fuel. While liquid fuels, which must be converted into a hydrogenous gas in particular prior to use, are present in liquid form at temperatures usual for an airplane and may only be stored in an uninsulated tank, gaseous fuels, such as hydrogen, require tanks tailored thereto. One possibility involves cryogenic tanks, in which the hydrogen is continuously kept at or cooled to a temperature below the boiling point of hydrogen; alternatively, pressurized tanks or metal hydride tanks may also be suitable for shorter operating periods.

A compressor unit comprising an air intake and air outlet is required in particular for preparing pressurized air. The air intake may be fluidically connected with an air supply opening in a fuselage of the airplane, which does not have to meet any special requirements, provided the auxiliary power system is used exclusively in ground operations. If the auxiliary power system is also to be operated during flight phases, it would be beneficial to use an NACA or ram air inlet, which must in particular be adjusted to a lowest possible additional flow resistance and the lowest possible noise emission both when just conveying air and during flight. The air outlet may be connected with a bleed air line, which consumes the pressurized air required by the auxiliary power system. As a result, the connection of other devices with the air outlet cannot be precluded.

Both axial and radial compressors may be used as the compressor unit, wherein more preference goes to radial compressors due to the absent combustion chamber and absent turbine, since they develop a very good pneumatic power level on limited installation space, in particular in a radial direction.

Since the auxiliary power system according to the invention is intended to replace a conventional auxiliary engine, it makes sense to connect the at least one fuel cell unit, the fuel tank, the compressor unit and electric motor to yield a coherent unit. Such a self-contained, independent unit may very easily be exchanged with an existing APU. In the coherent unit, care must be taken that the positions and expected physical parameters correspond to those of a conventional auxiliary engine at all connections.

As a consequence, using the features according to the invention may provide an auxiliary power system that is operated very efficiently and quietly, has a very high efficiency, and given the low noise and low pollutant emission, is predestinated for use on the ground.

The at least one fuel cell unit generates primarily electrical power, which supplies the electric motor. In order to deliver electrical power to the outside, the at least one fuel cell unit may be designed to provide excess power after supplying the electric motor. On the other hand, the delivery of electrical power may also be generated or assisted by other means, such as with another at least one fuel cell, or with a generator mentioned below, which is coupled with the electric motor.

In an especially advantageous embodiment, the compressor unit is set up to provide the pressurized air with a volume flow and pressure that makes the pressurized air sufficient for operating an air conditioning system on the airplane that comprises at least one air circulation-based air conditioning aggregate, at least while on the ground and during airplane startup. Therefore, the auxiliary power system is able not just replace the function of a conventional auxiliary engine, but rather to simultaneously unburden the main engines while starting up the airplane, which must provide a high level of mechanical power in the startup phase, and then must no longer deliver at least any more bleed air. This makes it possible to improve engine efficiency, with it even being conceivable for the auxiliary power system according to the invention to deliver electrical power and pressurized air during the entire flight.

In an advantageous embodiment, the fuel cell is cooled by air. In particular, using the compressor unit in the auxiliary power system yields a continuous flow of air, which may be used to flush or bathe the at least one fuel cell. This eliminates the need for a separate cooling circuit, for example one that utilizes a liquid coolant, so that the weight of the auxiliary power system is not increased by a separate cooling system.

It is further advantageous that the at least one fuel cell comprise an open cathode and be set up to be operated with air as the oxidant. This eliminates the need to carry along oxygen, and also to integrate feed lines running from an oxygen tank to the cathode. This decreases the overall weight of the auxiliary power system as well.

It is especially advantageous that the at least one fuel cell be designed as a polymer electrolyte membrane (PEM) fuel cell. The required temperature level is relatively low, in addition to which the design is technically sophisticated and comprises a high power density.

The auxiliary power system may further comprise at least two fuel cell units each with several fuel cells, which are each combined into one fuel cell stack with a circular segmented cross section and arranged side by side to envelop the shaft or electric motor. Several fuel cell units thus form a circular cross section, which leads to an annular configuration that may envelop the electric motor. This embodiment is not limited to two fuel cell units, with it rather being conceivable to use three or more fuel cells. The special advantage is that the electric motor and fuel cell units may form an integral unit, in which the stator consists of several windings that are each electrically connected with a fuel cell unit. As a consequence, several windings may be annularly arranged, and are electrically connected with different fuel cell units. Each fuel cell unit may actuate the accompanying windings by means of a corresponding inverter, so that actuating the individual inverters ultimately results in a rotating magnetic field. The rotor may comprise permanent magnets that follow the rotating magnetic field.

Such an arrangement is very advantageous, because there are extremely short cable lengths, if any, between the fuel cell units and the windings. In this conjunction, let it be noted that the number of stator poles may be higher than the number of rotor poles, and that a higher stator pole number simultaneously enables a quieter operation of the electric motor.

Directly coupling the fuel cell units and stator windings makes it possible to provide an especially powerful drive in a highly confined space, which may be operated with fuel from fuel cells, and may provide a sufficient level of power in the limited installation space prescribed by known auxiliary engines. Since the electric motor, and in particular the shaft, comprises a limited radial extension, the function of the fuel cells may be integrated in particular in a radial direction, thereby limiting the overall length of the auxiliary power system.

It is advantageous for the air intake of the compressor unit to be situated downstream, after the fuel cell unit. For example, this makes it possible to flush the fuel cell unit with air, which is aspirated into the compressor unit. In particular, the fuel cell unit may be cooled in this way, for example.

This may be enhanced even further by fluidically connecting the air intake of the compressor unit with air ducts of the fuel cell unit in such a way that air aspirated into the air inlet flows through the air ducts. As a consequence, air ducts integrated into the fuel cell unit for supplying the cathodes with air as the oxidants or solely for cooling purposes may automatically carry out their function during compressor operation.

It makes sense to use at least one power electronics unit, which is connected with the electric motor and voltage output of the fuel cell unit. The latter may convert the voltage delivered by the at least one fuel cell into a voltage desired for operating the electric motor, in particular by way of a signal supplied from the outside, thereby enabling in particular an easy startup of the electric motor and a smooth operation. It is conceivable that the at least one power electronics unit provides at least two different speed levels for this purpose, which may be specifically actuated by the signal supplied from the outside.

In this conjunction, let it be noted that the electric motor may of course also be set up to operate using a d.c. voltage supplied by the fuel cell.

In a special embodiment, the power electronics may be designed in such a way as to only generate the rotary field, wherein the voltage curve is sinusoidal or approximately sinusoidal on each motor coil in the progression of the rotary field.

A generator connected with the shaft may be provided for preparing an a.c. voltage, e.g., with a conventional APU. As a consequence, during compressor operation, a conventional or specially set up generator may be provided that is designed to provide an a.c. voltage that is normally used for operating the airplane. This eliminates the need for using additional power electronics that generates an a.c. voltage with a constant frequency out of the D.C. voltage.

The fuel tank may comprise an insulation, and be set up to store liquid hydrogen and prepare the fuel cell unit. The insulation of the fuel tank is further dimensioned in such a way that the evaporation rate of the liquid hydrogen stored in the fuel tank is equivalent to a mass flow of fuel required by the fuel cell unit. Operating a fuel cell with hydrogen and an oxidant always requires the supply of gaseous hydrogen. Given a liquid, i.e., cryogenic storage of hydrogen, it is required that at least a portion of the stored hydrogen be converted to the gaseous state through evaporation, which is then guided to the fuel cell. Due to the significant temperature difference between the liquid hydrogen and the environment, the insulation of the fuel tank may be used to control the evaporation rate of the hydrogen. If a specific electrical power has been predetermined, the necessary mass flow of hydrogen may be calculated therefrom. The required evaporation rate may be determined from the latter. The insulation may thereupon be adjusted. One must make sure that the evaporation rate is not too high, in particular to be able to prevent the release of hydrogen. It might also make sense to provide at least one small buffer tank, which could hold excess hydrogen, or to select an evaporation rate lying under the desired evaporation rate, and to operate an additional heater if the hydrogen mass flow drops below a specific level. The buffer tank may be realized as a gas phase of the liquid hydrogen container.

The invention further relates to an airplane having at least one such auxiliary power system.

The airplane may comprise an air conditioning system with at least one air circulation-based air conditioning aggregate, which may be coupled with the air outlet of the auxiliary power system. This makes it possible to operate the air conditioning system during ground operations of the airplane without having to turn on the main engines.

In an advantageous embodiment, the auxiliary power system drives the at least one air conditioning aggregate completely at least while on the ground and during airplane startup, without requiring any further supply of air. However, due to its efficiency, the auxiliary power system may also be used for permanently operating the air conditioning system during normal flight operations.

The air outlet of the compressor unit of the fuel cell system may be coupled with at least one engine for performing a pneumatic startup of the respective at least one engine. There is here no need for ground supply or separate compressor operation, which also very easily enables parking positions for an airplane located to the outside.

The invention further relates to the use of an auxiliary power system according to one of claims 1 to 11 for driving at least one air circulation-based air conditioning aggregate of an air conditioning system of an airplane at least while on the ground and during airplane startup, without requiring any further supply of air. All features enumerated above, which relate to special embodiments of the auxiliary power system, are also be used for the application. At the same time, let it be noted that the application is also suitable for driving the air conditioning aggregate during the entire flight or for a majority of the flight.

BRIEF DESCRIPTION OF THE DRAWINGS

Additional features, advantages and possible applications of the present invention may be gleaned from the following description of exemplary embodiments and the figures. All described and/or graphically illustrated features here comprise the subject matter of the invention whether taken in isolation or in any combination, even regardless of their composition in the individual claims or back references thereto. In addition, identical reference numbers on the figures stand for the same or similar objects.

DETAILED DESCRIPTION

Figures 1, 2A, 2B, 2C:
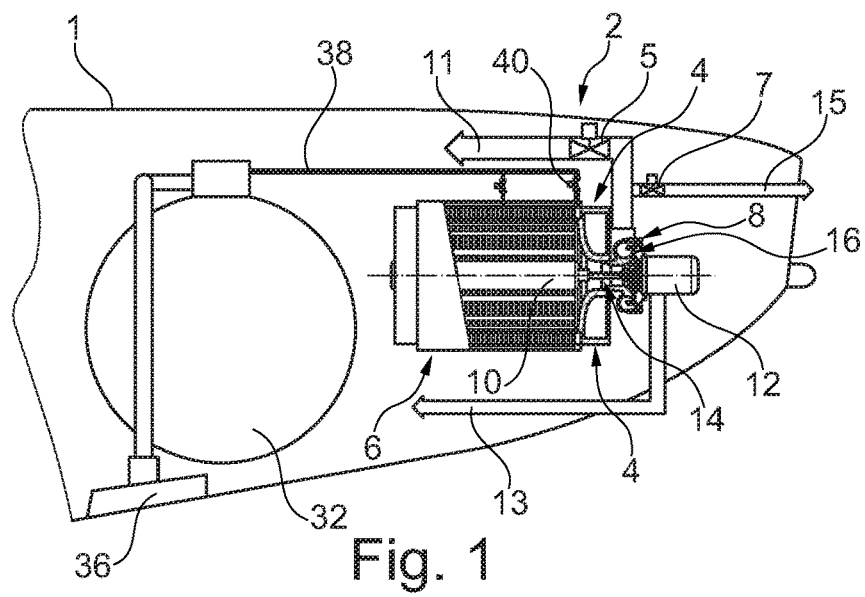
FIG. 1 shows an auxiliary power system in a schematic, block-based depiction in the rear of an airplane.
FIGS. 2a to 2c show details of the coupling between the motor and fuel cell units.

FIG. 1 shows an auxiliary power system 2 installed in the rear of an airplane 1, with several fuel cell units 4, an electric motor 6, a compressor unit 8, a shaft 10 and a generator 12. The electric motor 6 is connected by means of the shaft 10 with the compressor unit 8 and generator 12, and is supplied with electrical power via the fuel cell units 4. The voltage delivered by the fuel cell units may be connected, converted or transformed by the power electronics 9. FIGS. 2a and 2b present a detailed illustration of the functional principle.

The compressor unit 8 is exemplarily designed as a radial compressor with a tapering air intake 14 and an air outlet 16, from which pressurized air may be removed. One or more air conditioning aggregates (not shown) of an air conditioning system of the airplane may be supplied with compressed air, which especially preferably comprises essentially the same properties as the bleed air of a conventional auxiliary engine. As a result, the air conditioning aggregates of the air conditioning system may be driven without having to make any modifications inside of the airplane. Excess compressed air may be removed from the airplane 1 via a secondary line 15. Both the compressed air line 11 and the secondary line 15 may each establish a fluidic connection with the compressor by way of a valve 5, 7.

In particular, electrical power may be taken from the generator 12, which delivers an a.c. voltage to an electrical network 13. The generator 12 preferably corresponds to the one arranged on a conventional auxiliary engine.

Several fuel cell units 4 are shown in a simplified depiction on FIG. 2a, which may each be connected with an accompanying winding 20 of a stator 22 by means of an inverter 18 shown as a switch, for example that belongs to the power electronics 9. The objective is to actuate the inverters 18 in such a way as to generate a rotating magnetic field in the stator 22, which is followed by a rotor 24 located therein having permanent magnets 26 situated thereon.

The coupling between the fuel cell units 4 and accompanying windings 20 may be designed in such a way that the latter are mechanically and simultaneously conductively directly interconnected, or coupled via short electrical connections. It is conceivable for the windings 20 and fuel cell units 4 to each be arranged in the same housing 28, as shown on FIG. 2b.

As further evident from FIG. 2c, the fuel cell units 4 are annularly arranged one next to the other, so that they are an integral part of the electric motor, and are flushed by air during the operation of the compressor unit 8. According to FIG. 2b, this air is able to flow radially through the fuel cells 30 of the fuel cell units 4 with open cathodes, so that it is simultaneously provided with oxygen and cooled by the constant flow of air.

Figure 3:
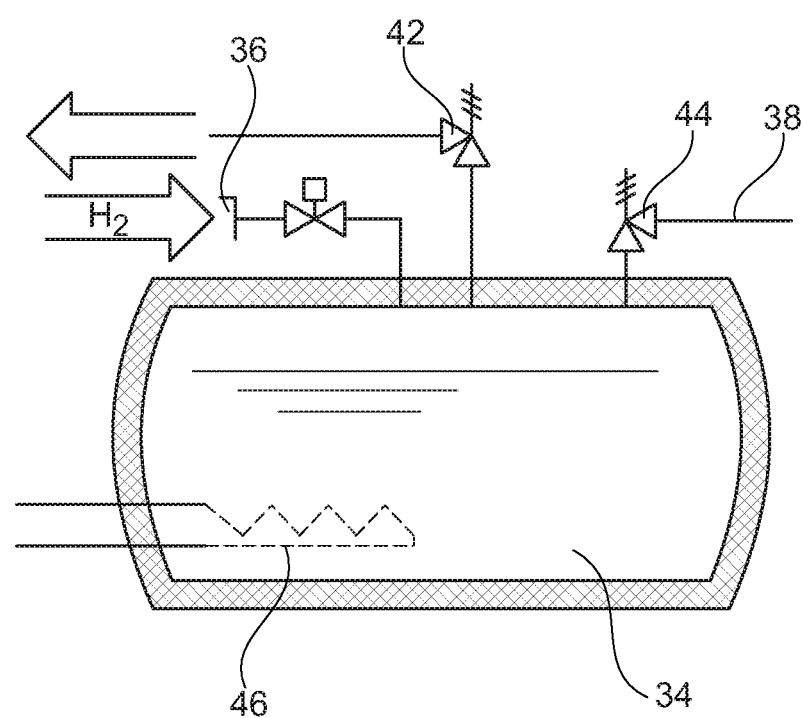
FIG. 3 shows a fuel tank.

The fuel guided to the fuel cell unit 4 may be taken from a fuel tank 32 or 34, which is exemplarily designed as a spherical tank 32 on FIG. 1, and as an oblong tubular tank 34 on FIG. 3. Both embodiments share in common that a filling connection 36 may be filled. The insulation of the fuel tank 32 or 34 is selected in such a way that liquid hydrogen is stored for a specific period of time, and evaporated at an evaporation rate determined by the insulation. This evaporated, gaseous fuel is then guided through a fuel line 38 to the fuel cell unit, wherein the supply may be regulated by a valve 40.

As shown on FIG. 3, the fuel tank 34 may comprise a safety valve 42 and an outlet or expansion valve 44, wherein the latter is connected with the fuel line 38. If too high a pressure comes about inside the tank 34, gaseous hydrogen may be released to the outside by way of the safety valve 42. However, if the hydrogen pressure is insufficient to provide the desired mass flow through the outlet valve 44 in gaseous form, a heater 46 integrated in the tank may be operated, causing a portion of the hydrogen to be evaporated.

In addition, let it be noted that "comprise" does not preclude other elements or steps, and that "a" or "an" does not rule out a plurality. Let it further be noted that features described with reference to one of the above exemplary embodiments may also be used in combination with other features of other exemplary embodiments described above. References in the claims are not to be construed as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An auxiliary power system for an airplane, comprising:
    at least two fuel cell units each with a plurality of fuel cells, a voltage output, a fuel intake and an outlet for reaction products,
    a fuel tank couplable with the fuel intake of the at least two fuel cell units,
    at least one compressor unit with a tapering air intake and an air outlet; and
    an electric motor couplable with a voltage output of the at least two fuel cell units and, by way of a shaft, with the at least one compressor unit,
    wherein at least the at least two fuel cell units, the at least one compressor unit and the electric motor are interconnected to yield a coherent unit configured to continuously provide electrical power and pressurized air,
    wherein the at least two fuel cell units are configured to be flushed by air during an operation of the at least one compressor unit such that the air flows radially through the plurality of fuel cells of the fuel cell units, and
    wherein the at least two fuel cell units are integral parts of the electric motor such that each of the at least two fuel cell units is connected with an accompanying winding of a stator by an inverter.

2. The auxiliary power system of claim 1, wherein the at least one compressor unit is set up to provide the pressurized air with a volume flow and pressure that makes the pressurized air sufficient for operating an air conditioning system on the airplane that comprises at least one air circulation-based air conditioning aggregate, at least while on ground and during airplane startup.

3. The auxiliary power system of claim 1, wherein the plurality of fuel cells of the at least two fuel cell units is cooled by air.

4. The auxiliary power system of claim 1, wherein the plurality of fuel cells comprises an open cathode each and is set up to be operated with air as the oxidant.

5. The auxiliary power system of claim 4, wherein the air intake of the at least one compressor unit is situated downstream, after the at least two fuel cell units, and
    wherein the air intake of the at least one compressor unit is fluidically connected with air ducts of the at least two fuel cell units in such a way that air aspirated into the at least one compressor flows through the air ducts.

6. The auxiliary power system of claim 1, wherein each of the plurality of fuel cells is a polymer electrolyte membrane fuel cell.

7. The auxiliary power system of claim 1, wherein the air intake of the at least one compressor unit is situated downstream, after the at least two fuel cell units.

8. The auxiliary power system of claim 1, further comprising at least one power electronics unit connected with the electric motor and voltage output of the at least two fuel cell units.

9. The auxiliary power system of claim 1, further comprising a generator connected with the shaft, the generator configured to provide an a.c. voltage.

10. The auxiliary power system of claim 1,
    wherein the fuel tank comprises an insulation, and is set up to store liquid hydrogen and prepare the at least two fuel cell units, and
    wherein the insulation is dimensioned in such a way that the evaporation rate of the liquid hydrogen stored in the fuel tank is equivalent to a mass flow of fuel required by the at least two fuel cell units.

11. The auxiliary power system of claim 1 further comprising a rotor having permanent magnets situated thereon, the rotor configured to follow the stators.

12. An airplane comprising at least one auxiliary power system comprising:
    at least two fuel cell units each with a plurality of fuel cells, a voltage output, a fuel intake and an outlet for reaction products,
    a fuel tank couplable with the fuel intake of the at least two fuel cell units,
    at least one compressor unit with a tapering air intake and an air outlet; and
    an electric motor couplable with a voltage output of the at least two fuel cell units and, by way of a shaft, with the at least one compressor unit,
    wherein at least the at least two fuel cell units, the at least one compressor unit and the electric motor are interconnected to yield a coherent unit configured to continuously provides electrical power and pressurized air,
    wherein the at least two fuel cell units and accompanying windings of the electric motor are mechanically and conductively interconnected and arranged in a same housing, and
    wherein the at least two fuel cell units are configured to be flushed by air during an operation of the at least one compressor unit such that the air flows radially through the plurality of fuel cells of the at least two fuel cell units, and
    wherein the at least two fuel cell units are integral parts of the electric motor.

13. The airplane of claim 12, further comprising an air conditioning system with at least one air circulation-based air conditioning aggregate couplable with the air outlet of the at least one compressor of the at least one auxiliary power system to drive the at least one air conditioning aggregate.

14. The airplane of claim 13, wherein the at least one auxiliary power system is configured to drive the at least one air conditioning aggregate completely at least while on ground and during airplane startup, without requiring any further supply of air.

* * * * *